(12) United States Patent
Krishnamurthi et al.

(10) Patent No.: US 8,437,368 B2
(45) Date of Patent: May 7, 2013

(54) SYSTEM AND METHOD FOR HANDING OVER A CALL FROM A PACKET-SWITCHED NETWORK TO A CIRCUIT-SWITCHED NETWORK

(75) Inventors: Govind Krishnamurthi, Arlington, MA (US); Hemant M. Chaskar, Woburn, MA (US)

(73) Assignee: Nokia Corporation, Espoo (FI)

( * ) Notice: Subject to any disclaimer, the term of this patent is extended or adjusted under 35 U.S.C. 154(b) by 3205 days.

(21) Appl. No.: 10/454,685

(22) Filed: Jun. 4, 2003

(65) Prior Publication Data
US 2004/0246990 A1 Dec. 9, 2004

(51) Int. Cl.
*H04J 3/16* (2006.01)
(52) U.S. Cl.
USPC .......................................................... 370/466
(58) Field of Classification Search .................... 370/466
See application file for complete search history.

(56) References Cited

U.S. PATENT DOCUMENTS

| | | | |
|---|---|---|---|
| 6,614,781 B1* | 9/2003 | Elliott et al. .................. | 370/352 |
| 7,003,298 B1* | 2/2006 | Jagadeesan ................... | 455/442 |
| 2002/0129236 A1 | 9/2002 | Nuutinen | |
| 2002/0191562 A1* | 12/2002 | Kumaki et al. ............... | 370/331 |
| 2003/0027595 A1* | 2/2003 | Ejzak ............................. | 455/560 |
| 2003/0091021 A1* | 5/2003 | Trossen et al. ................ | 370/349 |
| 2006/0089143 A1* | 4/2006 | Jagadeesan ................... | 455/436 |

FOREIGN PATENT DOCUMENTS

| | | |
|---|---|---|
| EP | 1 182 900 A | 2/2002 |
| WO | WO 99/20021 A2 | 4/1999 |
| WO | WO 01/82551 A | 11/2001 |
| WO | WO 02/07461 A2 | 1/2002 |
| WO | WO 02/45440 A1 | 6/2002 |
| WO | WO 02/052811 A1 | 7/2002 |
| WO | WO 03/003639 A2 | 1/2003 |

OTHER PUBLICATIONS

Office Action for Canadian Application No. 2,527,999 dated Sep. 21, 2011.
Office Action for Russian Application No. 2007134209/07(037381), dated Nov. 11, 2011.
Office Action for Phillipines Application No. 1-2010-501146, received Nov. 15, 2011.

* cited by examiner

*Primary Examiner* — Jianye Wu
(74) *Attorney, Agent, or Firm* — Alston & Bird LLP

(57) ABSTRACT

A communications system and method are provided for handing over a call from a packet-switched network (e.g., IP network) to a circuit-switched network (e.g., PLMN, PSTN, etc.). The system includes a first terminal capable of communicating via a packet-switched network and a circuit-switched network, and a second terminal capable of communicating via a circuit-switched network. The system also includes a gateway capable of mapping communications between a packet-switched network and at least one circuit-switched network. The gateway can support communication between the first terminal and the second terminal such that the first terminal has a packet-switched connection with the gateway and the second terminal has a circuit-switched connection with the gateway. The first terminal can then establish a circuit-switch connection with the gateway. Thereafter, the gateway can connect the circuit-switched connection established between the first terminal and the gateway with the circuit-switched connection between the gateway and the second terminal.

12 Claims, 4 Drawing Sheets

SYSTEM AND METHOD FOR HANDING OVER A CALL FROM A PACKET-SWITCHED NETWORK TO A CIRCUIT-SWITCHED NETWORK

FIELD OF THE INVENTION

The present invention relates generally to voice communication systems and methods of providing voice communications crossing between packet-switched networks and circuit-switched networks and, more particularly, relates to systems and methods for handing off such calls from the packet-switched network to a circuit-switched network.

BACKGROUND OF THE INVENTION

Voice communication is evolving from circuit-switched technology, such as provided by the Public Switched Telephone Network (PSTN) or Public Land Mobile Network (PLMN), to packet-switched technology, such as provided by Voice over IP (VoIP) techniques across IP Networks. Indeed, the Internet Engineering Task Force (IETF) has developed IP-based protocols to perform various functions in VoIP communications. In particular, for example, Session Initiation Protocol (SIP), specified in IETF request for comment document RFC 2543, has been developed for establishing voice calls between two parties. In contrast, Real-time Transport Protocol (RTP), specified in IETF request for comment document RFC 1889, has been developed to format packetized voice to be carried over the Internet once the call has been established.

At the same time as voice communication is evolving, wireless networks are evolving from circuit-switched voice networks (e.g., GSM, IS-136, IS-95) to packet-switched networks (e.g., WLAN, UMTS, cdma2000) capable of supporting multimedia applications to mobile end-users over IP. General Packet Radio Service (GPRS), which is an evolution of GSM, can support packet data (e.g., web browsing, email) in a cellular environment. Further evolution of GPRS, often referred to as the Universal Mobile Telecommunication System (UMTS), is expected to support real-time multimedia over IP (e.g., VoIP, video over IP, streaming media) in a cellular environment. In addition, the Third Generation Partnership Project (3GPP) has specified the IP Multimedia Subsystem (IMS) in UMTS to accomplish the control and service functions of wireless IP multimedia. In this regard, the 3GPP has adopted SIP as the signaling protocol in IMS. At the same time, in the cdma2000 world, the 3GPP2 has been developing the IP Multimedia Subsystem (IMS), formerly referred to as the IP Multimedia Domain (MMD), to implement the control and service functions of wireless IP multimedia. The 3GPP2 has also adopted SIP into the IMS specification.

The mass deployment of IP networks supporting VoIP is expected to happen in the future. At first, VoIP is expected to penetrate into fixed (desktop) phone and wireless LAN (WLAN) segments of the communications industry, followed by penetration into the cellular (3G) segment. Thus, two kinds of heterogeneity are conceivable in the near future. In one dimension, there will be a large number of VoIP phones, as well as a large number of PSTN phones. To address this heterogeneity, provisions are made in SIP to allow a VoIP phone to call a telephone number in PSTN and vice versa.

In another dimension, footprints of wireless access networks that are enabled with VoIP (e.g., WLAN, UMTS, cdma2000) will overlap with footprints of those using traditional circuit switched technology for voice (e.g., GSM, GPRS, IS-136, IS-95). In this regard, consider a mobile node that has two interfaces, such as WLAN and GSM. Assume that the mobile node is currently in the coverage of an indoor WLAN network and engaged in a voice call over a WLAN interface using VoIP with a correspondent node who is using a traditional (non-IP) telephone connected to the PSTN. In this regard, provisions exist within SIP to enable establishment of such a call, a part of which spans IP network and a part the PSTN. When the mobile node moves out of the coverage of WLAN network, however, the call is typically dropped. Dropping such calls, as will be appreciated, is often an annoyance to end users since they have to initiate a new call to resume the voice call. However, there are currently no techniques, to best knowledge of the inventors, that allow the user in an IP access network to undergo handoff to a circuit-switched access network without interrupting the voice call.

SUMMARY OF THE INVENTION

In light of the foregoing background, embodiments of the present invention provide a system and method of handing off a call from a packet-switched network, such as an IP network, to a circuit-switched network, such as a Public Land Mobile Network (PLMN) or a Public Switched Telephone Network (PSTN). Advantageously, the system and method of embodiments of the present invention are capable of handing off such a call in a seamless manner such that the call can be handed off such that the end points of the communication are not aware of the handover and/or do not have to take any specific action to effectuate, or as a result of, the handover. Additionally, such calls can be handed off to the circuit-switched network without being dropped. Calls can therefore be initiated and conducted between a terminal in a packet-switched network and a terminal in a circuit-switched network, while increasing the likelihood that the call can be completed uninterrupted. Embodiments of the present invention are therefore particularly advantageous in instances such as when a mobile station, engaged in such a call from a packet-switched network, moves outside an area serviced by the packet-switched network and within an area serviced by a circuit-switched network.

According to one aspect of the present invention, a communications system is provided that includes a first terminal, such as a mobile station or a fixed terminal, capable of communicating via a packet-switched network (e.g., IP network) and a circuit-switched network (e.g., PLMN, PSTN, etc.). The system also includes a second terminal, such as another mobile station or fixed terminal, capable of communicating via a circuit-switched network. In addition, the system includes a media gateway capable of mapping communications between a packet-switched network and at least one circuit-switched network. In accordance with this aspect of the present invention, the gateway is capable of supporting communication between the first terminal and the second terminal such that the first terminal has a packet-switched connection with the gateway and the second terminal has a circuit-switched connection with the gateway.

After one of the first and second terminals has setup communication with the other terminal, the first terminal can establish a circuit-switched connection with the gateway. For example, the first terminal can receive a handoff identifier hosted by the gateway, and thereafter establish a circuit-switched connection with the gateway based upon the handoff identifier. In this regard, the first terminal is capable of establishing the circuit-switched connection with the gateway via a second circuit-switched network, where the gateway is capable of supporting communication between the first terminal via a packet-switched network and the second terminal via a first circuit-switched network. Advantageously, according to various embodiments of the present invention, the first and second circuit-switched networks may be different or the same. Irrespective of whether the first and second circuit-switched networks are the same or different, however, after the circuit-switched connection is established between the first terminal and the gateway, the gateway is capable of connecting the circuit-switched connection established between the first terminal and the gateway with the circuit-switched connection between the gateway and the second terminal. In this manner, the gateway is capable of handing off communication from the packet-switched network to the circuit-switched network.

The first terminal can be adapted to establish the circuit-switched connection with the gateway when the signal strength of the packet-switched connection between the first terminal and the gateway, or more particularly an access point in communication between the first terminal and the gateway, is below a predetermined threshold for more than a predefined period of time. In such an embodiment, the gateway can then connect the circuit-switched connection established between the first terminal and the gateway with the circuit-switched connection between the gateway and the second terminal in instances in which the first terminal establishes the circuit-switched connection with the gateway.

As the first terminal establishes the circuit-switched connection with the gateway, the first terminal can be capable of transmitting a call session ID and/or a shared secret to the gateway. In this regard, the first terminal, gateway and/or a server (e.g., SIP server) in communication with the first terminal and the gateway can generate the call session ID and shared secret in conjunction with one of the first and second terminals setting up communication with the other terminal. By transmitting the call session ID, the gateway can be capable of connecting the circuit-switched connection established between the first terminal and the gateway with the circuit-switched connection between the second terminal and the gateway based upon the call session ID. And by transmitting the shared secret, the gateway can be capable of verifying the shared secret before the circuit-switched connection is established with the first terminal.

A method and computer program product are also provided for handing off communication from a packet-switched network to a circuit-switched network. Embodiments of the present invention therefore provide a system and method for handing off communication from a packet-switch network, such as an IP network, to a circuit-switched network, such as a PLMN or PSTN network. The system and method of embodiments of the present invention are capable of handing off such a call in a seamless manner such that the call can be handed off to the circuit-switched network without being dropped. Calls can therefore be initiated and conducted between a terminal in a packet-switched network and a terminal in a circuit-switched network, while increasing the likelihood that the call can be completed uninterrupted. For example, in accordance with embodiments of the present invention, the system and method of embodiments of the present invention are capable of handing off the voice call of a mobile station in an IP network when the mobile station moves outside a geographic support area for such a call. Also, for example, the system and method of embodiments of the present invention are capable of handing off a voice call of a fixed terminal in an IP network when the IP network experiences heavy traffic, transmission difficulties or the like, and thus becomes unable to adequately support the call. Therefore, the system and method of embodiments of the present invention solve the problems identified by prior techniques and provide additional advantages.

BRIEF DESCRIPTION OF THE DRAWINGS

Figure 1:
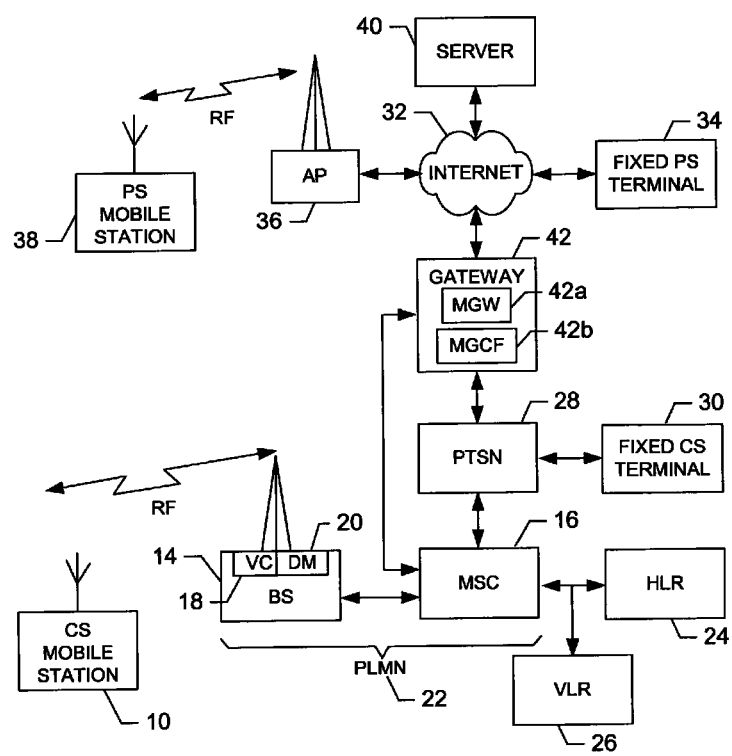
Figure 2:
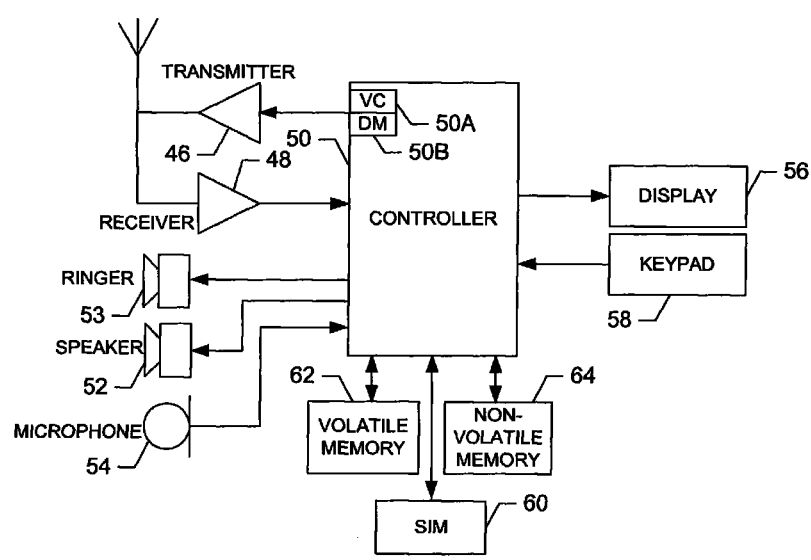
Figure 3A:
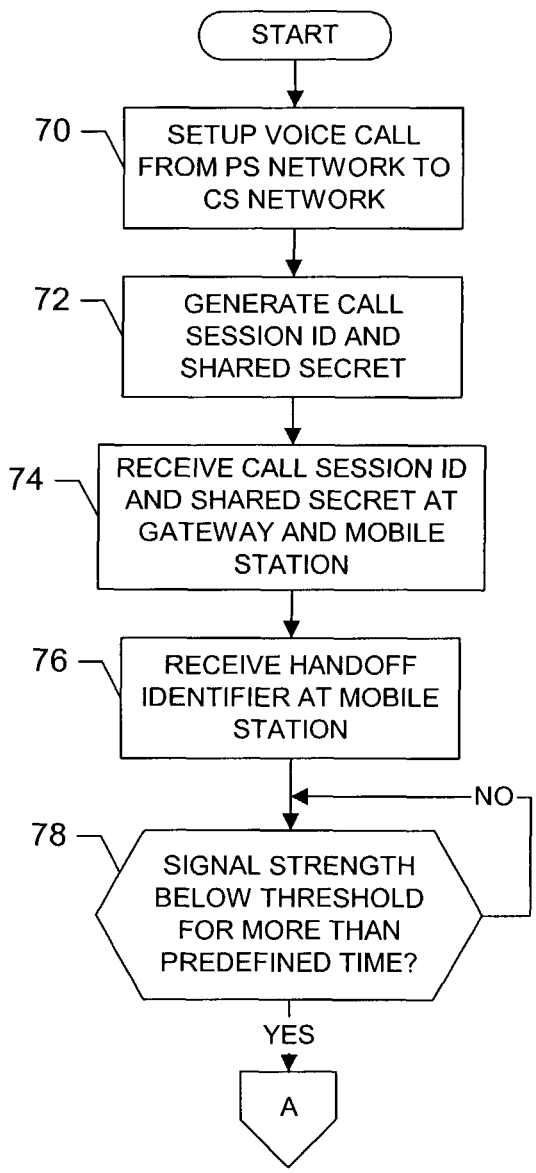
Figure 3B:
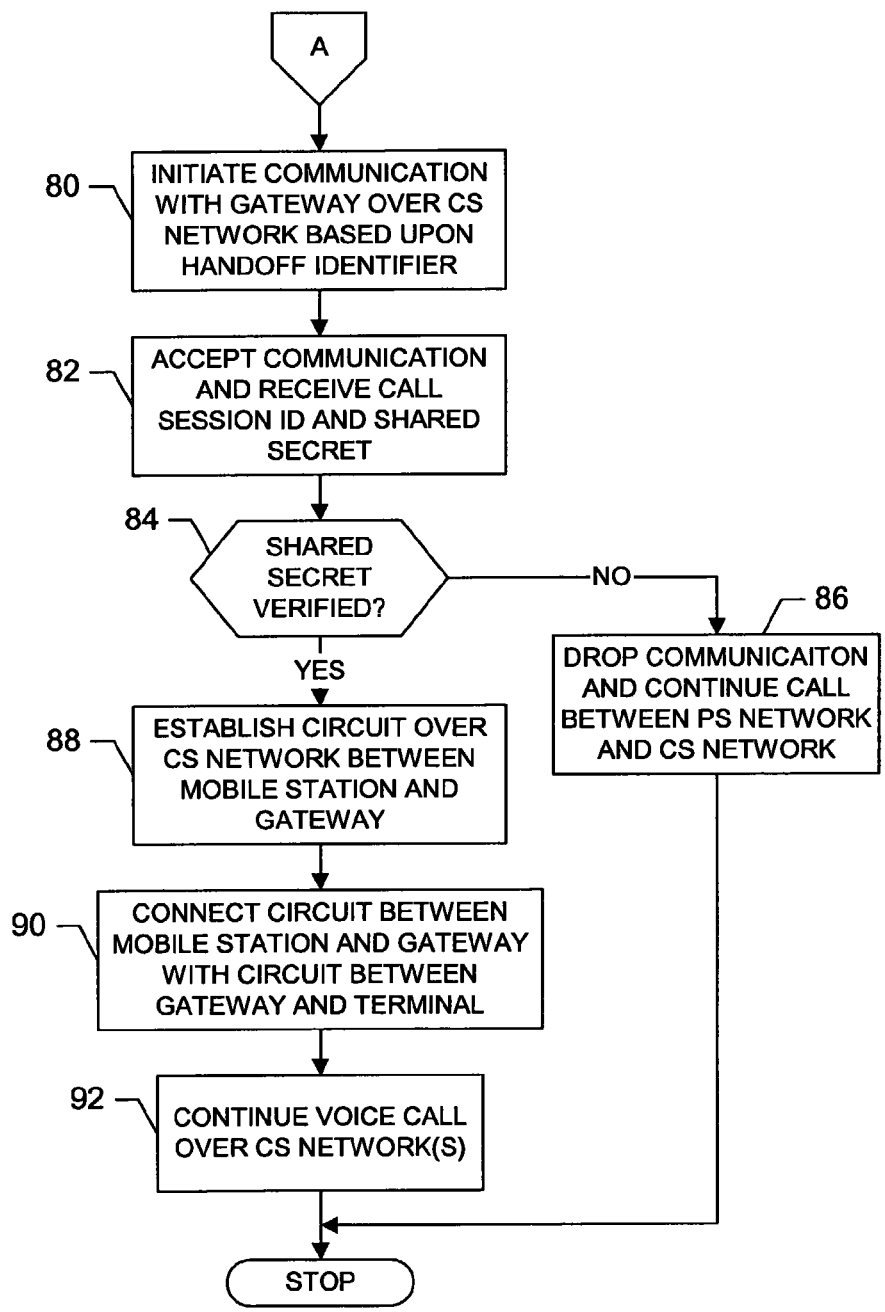

Having thus described the invention in general terms, reference will now be made to the accompanying drawings, which are not necessarily drawn to scale, and wherein:

FIG. 1 is a schematic block diagram of a communications system according to one embodiment of the present invention including a packet-switched network and two circuit-switched networks, in accordance with embodiments of the present invention;

FIG. 2 is a schematic block diagram of a mobile station according to one embodiment of the present invention; and FIGS. 3A and 3B are flow charts illustrating various steps in a method of handing off a call from a packet-switched network to a circuit-switched network in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, an illustration of one type of communications system including terminals, such as mobile stations and fixed terminals, that would benefit from the present invention is provided. It should be understood, however, that the mobile stations and fixed terminals illustrated and hereinafter described is merely illustrative of two types of terminals that would benefit from the present invention and, therefore, should not be taken to limit the scope of the present invention. While several embodiments of the mobile station are illustrated and will be hereinafter described as a mobile telephone for purposes of example, other types of mobile stations, such as portable digital assistants (PDAs), pagers, and other types of voice and text communications systems, can readily employ the present invention. In addition, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

As shown, a circuit-switched (CS) mobile station 10 is capable of transmitting signals to and receiving signals from a base site or base station (BS) 14. The base station is a part of a cellular network that includes a mobile switching center (MSC) 16, voice coder/decoders (vocoders) (VC) 18, data modems (DM) 20, and other units required to operate the PLMN. The MSC is capable of routing calls and messages to and from the CS mobile station when the CS mobile station is making and receiving calls. The MSC controls the forwarding of messages to and from the mobile station when the station is registered with the cellular network, and also controls the forwarding of messages for the mobile station to and from a message center (not shown). As will be appreciated by those skilled in the art, the cellular network may also be referred to as a Public Land Mobile Network (PLMN) 22.

Subscriber data of a CS mobile station 10 is stored permanently in a Home Location Register (HLR) 24 of the PLMN 22 and temporarily in the Visitor Location Register (VLR) 26 in the area of which the CS mobile station is located at a given moment. In this regard, the VLR contains selected administrative information necessary for call control and provision of the subscribed services for each CS mobile station currently located in the geographical area controlled by the VLR. Although each functional entity can be implemented as an independent unit, manufacturers of switching equipment generally implement the VLR together with the MSC 16 so that the geographical area controlled by the MSC corresponds to that controlled by the VLR, thus simplifying the signaling required.

The PLMN 22 is capable of providing voice communications in accordance with a number of different circuit-switched techniques. In this regard, the PLMN is capable of providing voice communications in accordance with first, second, third-generation wireless communication protocols and the like. For example, the PLMN may provide voice communications in accordance with second-generation (2G) wireless communication protocols IS-136 (TDMA), GSM, and/or IS-95 (CDMA). Within the PLMN, signaling communications may be provided in accordance with any of a number of different techniques, but signaling communications are typically provided in accordance with the Signaling System 7 (SS7) standard.

The MSC 16, and thus the PLMN 22, can be coupled to a Public Switched Telephone Network (PSTN) 28 that, in turn, is coupled to one, or more typically, a plurality of fixed CS terminals 30. Like the PLMN, the PSTN is capable of providing signaling communications in accordance with any of a number of different techniques, including SS7. The PSTN is also capable of providing voice communications in accordance with any of a number of different circuit-switched techniques. For example, the PSTN may provide voice communications in accordance with Time Division Multiplexing (TDM) techniques, such as 64 Kbps (CCIT), and/or Pulse Code Modulation (PCM) techniques, such as 56 Kbps (ANSI).

The PSTN 28 and the PLMN 22 (via the MSC 16) can also be coupled to, electrically connected to, or otherwise in electrical communication with a packet-switched network, such as an Internet Protocol (IP) network 32. The IP network may be coupled to one or more fixed packet-switched (PS) terminals 34. Additionally, the IP network may be coupled to one or more wireless access points 36, which may be coupled to one or more PS mobile stations 38. As shown, the IP network comprises a Wireless Local Area Network (WLAN), thereby providing communications in accordance with IEEE 802.11, for example. The packet-switched network can equally comprise any of a number of other types of networks. For example, the packet-switched network can comprise Universal Mobile Telecommunications Service (UMTS) or cdma2000 networks without departing from the spirit and scope of the present invention. As such, the packet-switched network can equally be configured to provide voice communications in accordance with the Internet Protocol (IP), for example, without departing from the spirit and scope of the present invention.

The IP network 32 may be capable of providing signaling communications in accordance with any of a number of different techniques. For example, the IP network may be capable of providing signaling in accordance with the Session Initiation Protocol (SIP). In this regard, SIP typically provides signaling for initiating a session between two or more endpoints in the IP network by making those endpoints aware of the session semantics. Accordingly, devices (or users that run certain applications on these devices) are registered with the SIP backbone so that an invitation to a particular session can be correctly delivered to these endpoints. To achieve this, SIP provides a registration mechanism for devices and users, and it applies mechanisms such as an SLP server 40 to route the session invitations appropriately.

To facilitate voice communications between the IP network 32, and the PLMN 22 and PSTN 28, the communications system typically also includes a gateway 42. The gateway is capable of mapping signaling and voice communications between the IP network, and the PLMN and/or PSTN to thereby permit communications between the IP network, and the PLMN and/or PSTN. In accordance with SIP, for example, the gateway may include a Media Gateway 42a that converts transmissions between a packet stream from the IP-network and the voice-encoded communication (e.g., TDM or PCM) from the PLMN and/or PSTN. Thus, voice is carried in packets over a packet-switched connection between the PS mobile station 38 or PS-terminal 34 and the MGW, while voice is carried over voice-encoded communication circuits in a circuit-switched connection between the MGW and the PSTN CS terminal 30.

Also in accordance with SIP, the gateway 42 may include a Media Gateway Control Function (MGCF) 42b that operates to terminate SIP signaling and control the functions of the MGW 42a. In this regard, the MGCF controls the functions of MGW in accordance with the Media Gateway Control protocol (MEGACO), such as that described in the IETF request for comment document RFC 3015, entitled: Megaco Protocol Version 1.0, the contents of which are hereby incorporated by reference in its entirety. In addition to terminating SIP signaling and controlling the MGW, the MGCF also typically performs conversion between SIP signaling in the IP network 32 and SS7 signaling in the PLMN 22 and/or PSTN 28, such as for call control.

The fixed CS terminal 30 and fixed PS terminal 34 can comprise any of a number of known devices capable of providing voice communications in accordance with circuit-switched and packet-switched techniques, respectively. For example, the CS terminal can comprise any of a number of known, conventional fixed wireline or wireless telephones. The PS terminal, for example, can comprise any of a number of known, conventional IP-enabled wireline or wireless telephones. Also, for example, the PS terminal can comprise a processor, such as a personal computer, laptop computer or the like, capable of operating a software application for providing voice communications in accordance with packet-switched techniques. As will be appreciated by those skilled in the art, and in accordance with embodiments of the present invention, the PS terminal may be capable of operating in accordance with the CS terminal, and vice versa. As such, as described herein, the term "fixed terminal" will be used to describe a single fixed terminal capable of performing the functions of both the PS terminal and the CS terminal.

Reference is now drawn to FIG. 2, which illustrates a block diagram of a mobile station that may comprise the CS mobile station 10 or the PS mobile station 38. Like with the Fixed CS terminal 30 and Fixed PS terminal 34, in accordance with embodiments of the present invention, the PS mobile station may be capable of operating in accordance with the CS mobile station, and vice versa. Thus, as described herein, the term "mobile station" will be used to describe a single mobile station capable of performing the functions of both the PS mobile station and the CS mobile station. The mobile station includes a transmitter 46, a receiver 48, and a controller 50 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first, second and/or third-generation communication protocols or the like. For example, the mobile station may be capable of operating in accordance with second-generation (2G) wireless communication protocols IS-136 (TDMA), GSM, and IS-95 (CDMA).

It is understood that the controller 50 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 50A, and may include an internal data modem (DM) 50B. Further, the controller 50 may include the functionally to operate one or more software programs, which may be stored in memory (described below). For example, the controller may be capable of operating a connectivity program that allows the mobile station to transmit and receive content and/or voice communications from the IP network 32, such as according to the Wireless Application Protocol (WAP), for example.

The mobile station also comprises a user interface including a conventional earphone or speaker 52, a ringer 53, a microphone 54, a display 56, and a user input interface, all of which are coupled to the controller 50. The user input interface, which allows the mobile station to receive data, can comprise any of a number of devices allowing the mobile station to receive data, such as a keypad 58, a touch display (not shown) or other input device. In embodiments including a keypad, the keypad includes the conventional numeric (0-9) and related keys (#, *), and other keys used for operating the mobile station.

The mobile station 10 can also include memory, such as a subscriber identity module (SIM) 60, a removable user identity module (R-UIM) or the like, which typically stores information elements related to a mobile subscriber. In addition to the SIM, the mobile station can include other memory. In this regard, the mobile station can include volatile memory 62, such as volatile Random Access Memory (RAM) including a cache area for the temporary storage of data. The mobile station can also include other non-volatile memory 64, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can include an identifier, such as an international mobile equipment identification (IMEI) code, capable of uniquely identifying the mobile station, such as to the MSC 16.

Referring now to FIGS. 3A and 3B, in accordance with embodiments of the present invention, the communications system is capable of handing off the voice call of a mobile station or fixed terminal from a packet-switched network (e.g., IP network 32) to a circuit-switched network (e.g., PLMN 22 or PSTN 28). In this regard, a mobile station or fixed terminal engaged in a voice call via a packet-switched network can be handed off to a circuit-switched network in instances in which the packet-switched network cannot continue to adequately support the call. For example, in accordance with embodiments of the present invention, the system is capable of handing off the voice call of a mobile station from the IP network when the mobile station moves outside a geographic support area for a VoIP call, such as outside the geographic region supported by the AP 36. Also, for example, in accordance with embodiments of the present invention, the system is capable of handing off a voice call of a fixed terminal from the IP network when the IP network experiences heavy traffic, transmission difficulties or the like, and thus becomes unable to adequately support the call.

As described below, the system and method will be explained in the context of handing off a call of a mobile station from the IP network 32 to the PLMN 22, where the mobile station is engaged in a call with a fixed terminal via the PSTN 28. It should be understood, however, that the system and method are equally applicable to any of a number of other contexts. For example, the system and method can be applied to the context of handing off a call of a fixed terminal from the IP network to the PSTN, where the fixed terminal is engaged in a call with a mobile station via the PLMN or another fixed terminal via the PSTN.

To effectuate a call handoff from a packet-switched network to a circuit-switched network, the gateway 42 is capable of hosting a handoff identifier, such as a handoff telephone number, that the gateway can utilize to provide the handoff. In operation, the mobile station and the fixed terminal can establish or setup a voice call via the IP network 32 and the PSTN 28, respectively, such as in accordance with conventional techniques, as shown in block 70. In this regard, once the voice call is setup, the mobile station and fixed terminal can transmit and receive voice communications in the following manner: the mobile station and gateway maintain a packet-switched connection, while the gateway and fixed terminal maintain a circuit-switched connection. Either during or after the call setup, a call session ID and a shared secret (e.g., password) can be generated in conjunction with the voice communication setup between the mobile station and the fixed terminal, and thereafter received by the gateway and the mobile station, as illustrated in blocks 72 and 74. In addition, the mobile station can receive the handoff identifier from the gateway either before, during or after setting up the call, as shown in block 76.

In accordance with embodiments of the present invention, the call session ID and shared secret can be generated by any one or more of a number of different elements participating in establishment of the call. For example, the call session ID and shared secret can be generated by the gateway 42 and received by the mobile station, such as in accordance with SIP extensions or any other standard method of message transfer between two nodes in an IP network. Alternatively, the call session ID and shared secret can be generated by the server 40, and received by the mobile station and gateway, such as in the manner indicated above. Further, for example, the call session ID and shared secret can be generated by the mobile station and received by the gateway, such as in the manner indicated above.

After the mobile station and the fixed terminal have setup the voice call via the IP network 32 and the PSTN 28, respectively, the call between the mobile station and the fixed terminal can commence. During the voice call, but after the gateway 42 and mobile station have received the call session ID and shared secret, and the mobile station has received the handoff identifier, the call can be handed off from the IP network to the PLMN 22. The handoff can be initiated in any of a number of different manners. In one advantageous embodiment, for example, the mobile station can monitor a signal strength of the call via the IP network, as shown in block 78. Then, when the signal strength decreases below a predetermined threshold for more than a predefined period of time, the mobile station can initiate the handoff.

To initiate a handoff of the call from the LP network 32 to the PLMN 22, according to one embodiment of the present invention, the mobile station can attempt to establish communication with the gateway 42 via the PLMN based upon the handoff identifier. For example, the mobile station can initiate the handoff by calling the handoff telephone number over the PLMN, such as in accordance with circuit-switched techniques, as shown in block 80. Thereafter, the gateway can accept communication with the gateway, such as by answering the call to the handoff telephone number. As illustrated in block 82, once a call is established via the PLMN between the mobile station and the gateway, the mobile station can transmit the call session ID and shared secret to the gateway, such as according to dual-tone multi-frequency (DTMF) techniques.

After receiving the call session ID and the shared secret, the gateway 42 can verify the shared secret, such as in accordance with conventional techniques, as shown in block 84. If the shared secret is not verified, the gateway can respond in any of a number of different manners. For example, as shown, the gateway can drop communication with the mobile station via the PLMN 22, as shown in block 86. In such an instance, the voice call between the mobile station in the IP network 32 and the fixed terminal in the PSTN 28 can continue. Also, for example, the gateway can transmit an ACK or NACK message back to the mobile station. In this regard, if the gateway transmits an NACK message back to the mobile station, the mobile station can be configured to reattempt to establish communication with the gateway, and resend the call session ID and shared secret. As will be appreciated, in such instances, the voice call may continue with decreased signal strength, and may even be dropped if the signal strength decreases below a level capable of being carried by the respective networks.

If the shared secret is validated, the gateway 42 can establish a circuit-switched connection with the mobile station, as shown in block 88. As will be appreciated, the circuit-switched connection between the gateway and the mobile station may operate concurrently with the packet-switched connection between the mobile station and the gateway, over which the voice call is partially carried. The mobile station can now transmit voice communication to the gateway in accordance with a circuit-switched technique, such as the same circuit-switched technique between the gateway and the fixed terminal in the PLMN 22. Once the circuit is established between the mobile station and the gateway, the gateway can connect this newly established circuit-switched connection between the mobile station and the gateway to the existing circuit-switched connection between the gateway and the fixed terminal based upon the call session ID, as shown in block 90. As such, the mobile station can thereafter communicate with the fixed terminal in accordance with a circuit-switched technique, as opposed to a packet-switched technique, as shown in block 92.

Therefore, the system and method of embodiments of the present invention are capable of handing off communication from a packet-switched network to a circuit-switched network. Advantageously, the system and method of embodiments of the present invention are capable of handing off such a call in a seamless manner such that the call can be handed off to the circuit-switched network without being dropped. Calls can therefore be initiated and conducted between a terminal via a packet-switched network and a fixed terminal via a circuit-switched network, while increasing the likelihood that the call can be completed uninterrupted, such as by handing off the call from the packet-switched network to a circuit-switched network, if necessary. For example, in accordance with embodiments of the present invention, the system and method of embodiments of the present invention are capable of handing off the voice call of a mobile station from an IP network when the mobile station moves outside a geographic support area for such a call. Also, for example, the system and method of embodiments of the present invention are capable of handing off a voice call of a fixed terminal from an IP network when the IP network experiences heavy traffic, transmission difficulties or the like, and thus becomes unable to adequately support the call.

According to one aspect of the present invention, the system of the present invention, such as the controller 50 of the mobile station, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 3A and 3B are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Embodiments of the present invention therefore provide a system and method for handing off a call from a packet-switched network to a circuit-switched network. Many modifications and other embodiments of the invention will come to mind to one skilled in the art to which this invention pertains having the benefit of the teachings presented in the foregoing descriptions and the associated drawings. For example, as described above, the gateway 42 hosts a handoff identifier (e.g., handoff telephone number), and a call session ID is generated in conjunction with setting up a call between the mobile station and the fixed terminal. In an alternative embodiment, a unique handoff identifier can be generated or assigned to each active voice call. In such instances, because the handoff identifier is unique to the call session, a call session ID need not be generated or received by the mobile station or the gateway. Instead, the unique handoff identifier and shared secret can be communicated to the mobile station and the gateway.

Also, for example, the mobile station may be capable of maintaining both the packet-switched connection and circuit-switched connection with the gateway 42. In this embodiment, the mobile station can establish the circuit-switch connection with the gateway, but instead of dropping the packet-switched connection after connecting the established circuit-switched connection with the circuit-switched connection between the gateway and the fixed terminal, the gateway and mobile station maintains the packet-switched connection. The gateway can then be capable of monitoring both connections, and dynamically selecting one of the two connections as being the optimal connection, such as the connection with the greatest signal strength. Based upon the dynamic selection of the optimal connection, the gateway can then be capable of handing off the call between the two connections (packet-switched and circuit-switched) such that the optimal connection is connected to the circuit-switched connection between the gateway and the fixed terminal. As such, the gateway can be capable of handing the call back off to the packet-switched connection, such as in instances in which the signal strength between the mobile station and the gateway increases back above the predetermined threshold for more than a predefined period of time. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A communications system comprising:
a first terminal configured to communicate via a packet-switched network and a circuit-switched network;
a second terminal configured to communicate via a circuit-switched network; and
a gateway configured to map communications between a packet-switched network and at least one circuit-switched network,
wherein the gateway is configured to support communication between the first terminal and the second terminal such that the first terminal has a packet-switched connection with the gateway and the second terminal has a circuit-switched connection with the gateway, wherein the first terminal is configured to thereafter initiate a handoff of communication from the packet-switched network to the circuit-switched network, the first terminal being configured to establish a circuit-switched connection with the gateway, and wherein the gateway is configured to connect the established circuit-switched connection between the first terminal and the gateway with the circuit-switched connection between the gateway and the second terminal to thereby handoff communication from the packet-switched network to the circuit-switched network;
wherein the first terminal is configured to receive a handoff identifier hosted by the gateway, and wherein the first terminal is configured to establish the circuit-switched connection with the gateway based upon the handoff identifier, and
wherein the first terminal is configured to establish the circuit-switched connection with the gateway in an instance in which a signal strength of the packet-switched connection between the first terminal and the gateway is below a predetermined threshold for more than a predefined period of time, and wherein the gateway is configured to connect the circuit-switched connection established between the first terminal and the gateway with the circuit-switched connection between the gateway and the second terminal in instances in which the first terminal establishes the circuit-switched connection with the gateway.

2. A communications system according to claim 1, wherein the first terminal is further configured to transmit a shared secret to the gateway as the first terminal establishes the circuit-switched connection with the gateway to enable the gateway to verify the shared secret before the circuit-switched connection is established with the first terminal.

3. A communications system according to claim 1, wherein the gateway is configured to support communication between the first terminal via a packet-switched network and the second terminal via a first circuit-switched network, and wherein the first terminal is configured to thereafter establish a circuit-switched connection with the gateway via a second circuit-switched network that is different than the first circuit-switched network.

4. A communications system according to claim 1, wherein the gateway is configured to support communication between the first terminal via a packet-switched network and the second terminal via a circuit-switched network, and wherein the first terminal is configured to thereafter establish a circuit-switched connection with the gateway via the same circuit-switched network.

5. A method comprising:
setting up communication between a first terminal and a second terminal over a gateway such that the first terminal has a packet-switched connection with the gateway and the second terminal has a circuit-switched connection with the gateway;
initiating, at the first terminal, a handoff of communication from the packet-switched network to the circuit-switched network;
establishing a circuit-switched connection between the first terminal and the gateway via a circuit-switched network; and
connecting the circuit-switched connection established between the first terminal and the gateway with the circuit-switched connection between the gateway and the second terminal,
wherein establishing a circuit-switched connection comprises establishing a circuit-switched connection between the first terminal and the gateway based upon a handoff identifier hosted by the gateway, and
monitoring a signal strength of the packet-switched connection between the first terminal and the gateway,
wherein establishing a circuit-switched connection comprises establishing a circuit-switched connection when the signal strength of the packet-switched connection is below a predetermined threshold for more than a predefined period of time, and wherein connecting the circuit-switched connection comprises connecting the circuit-switched connection established between the first terminal and the gateway with the circuit-switched connection between the gateway and the second terminal in instances in which the circuit-switched connection is established between the first terminal and the gateway.

6. A method according to claim 5, wherein establishing a circuit-switched connection further includes transmitting a shared secret to the gateway, and thereafter verifying the shared secret before establishing the circuit-switched connection.

7. A method according to claim 5, wherein setting up communication comprises setting up communication between the first terminal via a packet-switched network and the second terminal via a first circuit-switched network, and wherein establishing a circuit-switched connection comprises establishing a circuit-switched connection between the first terminal and the gateway via a second circuit-switched network that is different than the first circuit-switched network.

8. A method according to claim 5, wherein setting up communication comprise setting up communication between the first terminal via a packet-switched network and the second terminal via a circuit-switched network, and wherein establishing a circuit-switched connection comprises establishing a circuit-switched connection between the first terminal and the gateway via the same circuit-switched network.

9. An apparatus comprising,
at least a processor, a memory having computer coded instructions, said instructions, when executed by the processor, being configured to cause the apparatus to:
map communications between a packet-switched network and at least one circuit-switched network,
support communication between a first terminal and a second terminal such that the first terminal has a packet-switched connection with the apparatus and the second terminal has a circuit-switched connection with the apparatus,
receive an indication of the first terminal initiating a handoff of communication from the packet-switched network to the circuit-switched network,
communicate with the first terminal to establish a circuit-switched connection between the first terminal and the apparatus,
connect the circuit-switched connection established between the first terminal and the apparatus with the circuit-switched connection between the apparatus and the second terminal to thereby handoff communication from the packet-switched network to the circuit-switched network,
host a handoff identifier,
communicate with the first terminal to establish the circuit-switched connection based upon the handoff identifier, and
wherein the instructions are further configured to, with the processor, cause the apparatus to:
communicate with the first terminal to establish the circuit-switched connection when a signal strength of the packet-switched connection between the first terminal and the apparatus is below a predetermined threshold for more than a predefined period of time, and
connect the circuit-switched connection established between the first terminal and the apparatus with the circuit-switched connection between the apparatus and the second terminal in instances in which the first terminal establishes the circuit-switched connection with the apparatus.

10. An apparatus according to claim 9, wherein the processor is further configured to receive a shared secret as the circuit-switched connection is established with the first terminal, and wherein the processor is configured to verify the shared secret before the circuit-switched connection is established with the first terminal.

11. A computer program product comprising a non-transitory computer-readable storage medium, having computer-readable program code portions stored therein, the computer-readable program portions configured to perform a method comprising:
setting up communication between a first terminal and another terminal over a gateway such that the first terminal has a packet-switched connection with the gateway and the other terminal has a circuit-switched connection with the gateway;
initiating, at the first terminal, a handoff of communication from the packet-switched network to the circuit-switched network;
establishing a circuit-switched connection between the first terminal and the gateway via a circuit-switched network;
connecting the circuit-switched connection established between the first terminal and the gateway with the circuit-switched connection between the gateway and the other terminal,
wherein establishing a circuit-switched connection comprises establishing a circuit-switched connection between the first terminal and the gateway based upon a handoff identifier hosted by the gateway, and
monitoring a signal strength of the packet-switched connection between the first terminal and the gateway, and wherein establishing a circuit-switched connection comprises establishing a circuit-switched connection when the signal strength of the packet-switched connection is below a predetermined threshold for more than a predefined period of time, and wherein connecting the circuit-switched connection comprises connecting the circuit-switched connection established between the first terminal and the gateway with the circuit-switched connection between the gateway and the other terminal in instances in which the circuit-switched connection is established between the first terminal and the gateway.

12. A computer-readable storage medium according to claim 11, wherein establishing a circuit-switched connection includes transmitting a shared secret to the gateway to enable the gateway to thereafter verify the shared secret before establishing the circuit-switched connection.

* * * * *